United States Patent
Zenghui (12)

(10) Patent No.: US 9,684,391 B1
(45) Date of Patent: Jun. 20, 2017

(54) TELESCOPIC MECHANISM AND TOUCH TOOL FOR WRITING INSTRUMENT OR THE LIKE

(71) Applicant: Logomark, Inc., Tustin, CA (US)

(72) Inventor: Qi Zenghui, Yuyao (CN)

(73) Assignee: Logomark, Inc., Tustin, CA (US)

( * ) Notice: Subject to any disclaimer, the term of this patent is extended or adjusted under 35 U.S.C. 154(b) by 2 days.

(21) Appl. No.: 15/018,553

(22) Filed: Feb. 8, 2016

(30) Foreign Application Priority Data

Dec. 11, 2015 (CN) .................. 2015 2 10247621 U

(51) Int. Cl.
*G06F 3/033* (2013.01)
*G06F 3/0354* (2013.01)

(52) U.S. Cl.
CPC .................. *G06F 3/03545* (2013.01)

(58) Field of Classification Search
CPC .... G06F 3/033; G06F 3/0354; G06F 3/03545; G06F 3/03546; G06K 11/06; B43K 23/00; B43K 23/12; B43K 23/128; B43K 24/06; B43K 24/14
See application file for complete search history.

(56) References Cited

U.S. PATENT DOCUMENTS

| | | | | |
|---|---|---|---|---|
| 2,896,577 A | * | 7/1959 | Merryman | B43K 24/02 401/112 |
| 6,609,846 B1 | * | 8/2003 | Lai | B43K 24/02 401/112 |
| 8,508,510 B2 | | 8/2013 | Kim | |
| 8,957,879 B2 | | 2/2015 | Mao | |
| 9,007,302 B1 | * | 4/2015 | Bandt-Horn | G06F 3/0202 345/156 |
| 2007/0171213 A1 | | 7/2007 | Yang et al. | |
| 2008/0225007 A1 | * | 9/2008 | Nakadaira | G06F 3/04815 345/173 |
| 2009/0014524 A1 | * | 1/2009 | Silverbrook | B41J 2/17503 235/468 |
| 2010/0294574 A1 | | 11/2010 | Chen | |
| 2011/0094804 A1 | | 4/2011 | Liang | |
| 2013/0194242 A1 | | 8/2013 | Park et al. | |
| 2015/0022503 A1 | | 1/2015 | Chang et al. | |

* cited by examiner

*Primary Examiner* — Joe H Cheng
(74) *Attorney, Agent, or Firm* — Larry K. Roberts

(57) ABSTRACT

An exemplary embodiment of a touch tool mechanism includes a touch tool, including a stylus and an elongated bar connected with the stylus. The mechanism is carried on a pen holder. A rotating sleeve assembly is rotatable by the user, which extends the stylus above a retracted position for use in operating on an intelligent device. Further rotation of the sleeve assembly retracts the stylus into a storage position.

12 Claims, 4 Drawing Sheets

TELESCOPIC MECHANISM AND TOUCH TOOL FOR WRITING INSTRUMENT OR THE LIKE

BACKGROUND

Writing instrument or tools such as pens have been widely used in daily life, so people not only use it to write, but also as a tool for other purposes. Particularly due to the popularity of intelligent devices such as smart phones, tablets or computers with touch sensitive displays, people often need touch tools, such as a stylus. Such touch tools are neither convenient to carry nor easy to store, so how to use a pen or other writing instrument to carry this type of tool is a purpose of an exemplary embodiment of this invention.

SUMMARY

Exemplary embodiment of the invention aims to solve the technical problem of overcoming disadvantages of the prior art and to provide a pen or other instrument with a touch mechanism which can conveniently carry touch tools.

An exemplary embodiment of a pen or writing instrument touch tool mechanism includes a touch tool, which may include a stylus portion and a straight bar connected with the stylus portion. The mechanism includes a hollow cylindrical upper ring, wherein its upper part forms a step in which the cylinder can accommodate the touch tool, the step supported on a rotating sleeve liner, and a symmetrical vertical guide groove is arranged in the lower cylindrical inner chamber.

The mechanism includes a rotating wheel, wherein its upper part is provided with a cylindrical hole for accommodating the straight bar of the touch tool. the upper outer ring is provided with a guiding element matched with the guide groove, and the lower part is provided with an incline surface corresponding to the deck of the lower ring. A lower ring is provided, with an upper outer part having an annular spacing groove, and an inner chamber provided with a deck corresponding to the incline surface, and the middle outer part is provided with a support ring.

A rotating sleeve assembly is arranged between the outer step of the upper ring and the support ring of the lower ring and sheathed outside the upper ring, its lower part is provided with a projection corresponding to the annular spacing ring, and the projection is spaced within the annular spacing ring of the lower ring.

The support ring of the lower ring is fixed inside a pen holder of the pen or instrument.

When the rotating sleeve is rotated, it drives the rotating wheel to rotate, the incline surface on the lower part of the rotating wheel touches the support sheet of the lower ring and butts against the support sheet, and the wheel rises along with its rotation, so the touch tool fixed to the rotating wheel rises and extends out of the upper ring; during further rotation, the incline surface surmounts the support sheet and enters the space of the lower ring and the rotating wheel is reset under the restoring force of a spring, so that the touch tool is retracted into the step of the upper ring.

The rotating sleeve assembly includes a rotating sleeve and a rotating sleeve liner, wherein the rotating sleeve is sheathed outside the rotating sleeve liner, the rotating sleeve liner is sheathed outside the upper ring, its lower part is provided with a projection corresponding to the annular spacing ring, and the projection is spaced within the annual spacing ring of the lower ring.

In an exemplary embodiment, the touch tool is a disc type stylus, of which the operation or writing is carried out with the disc type stylus on an intelligent device.

In an exemplary embodiment, a pen holder liner is arranged and fixed to the inner chamber of the pen sheath, and the lower part of the lower ring is fixed to the pen holder liner, with wider adaptability.

Preferably, the threads of the lower part of the lower ring are connected with the pen sheath liner, which is convenient for assembly and disassembly.

Compared with the prior art, an exemplary embodiment of the invention has advantages, including that through the touch tool mechanism, other devices can be operated with the touch tool, so the touch tool is convenient to carry, easy to use and simple in structure.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
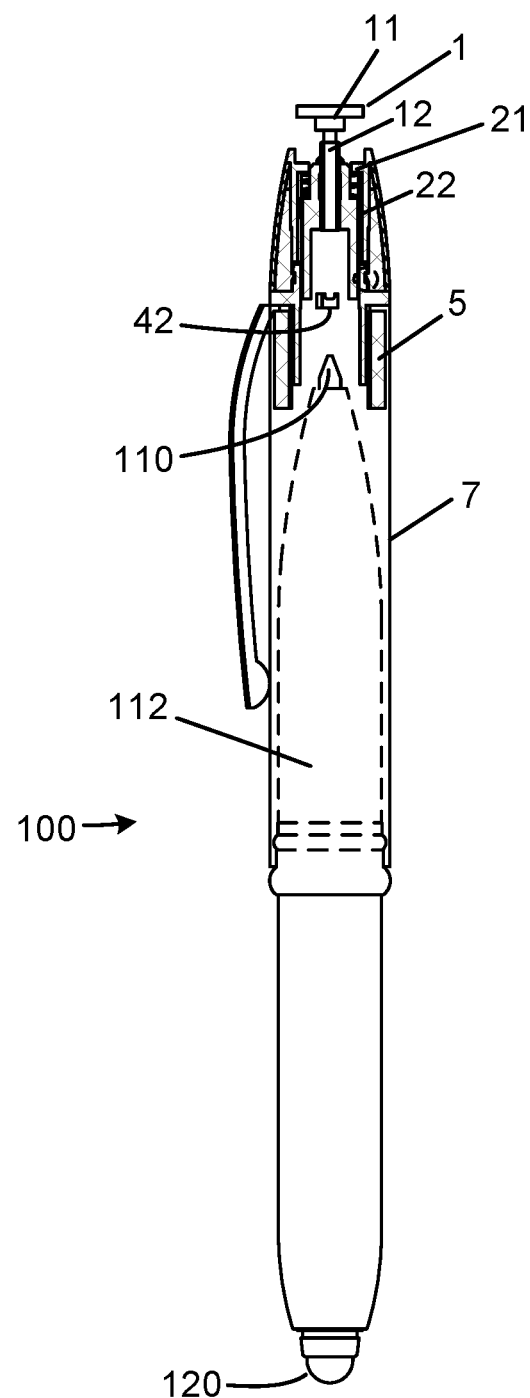
FIG. 1 is a partial section view of an exemplary embodiment of the invention, showing the touch tool in an extended position.

In the following detailed description and in the several figures of the drawing, like elements are identified with like reference numerals.

Figure 2:
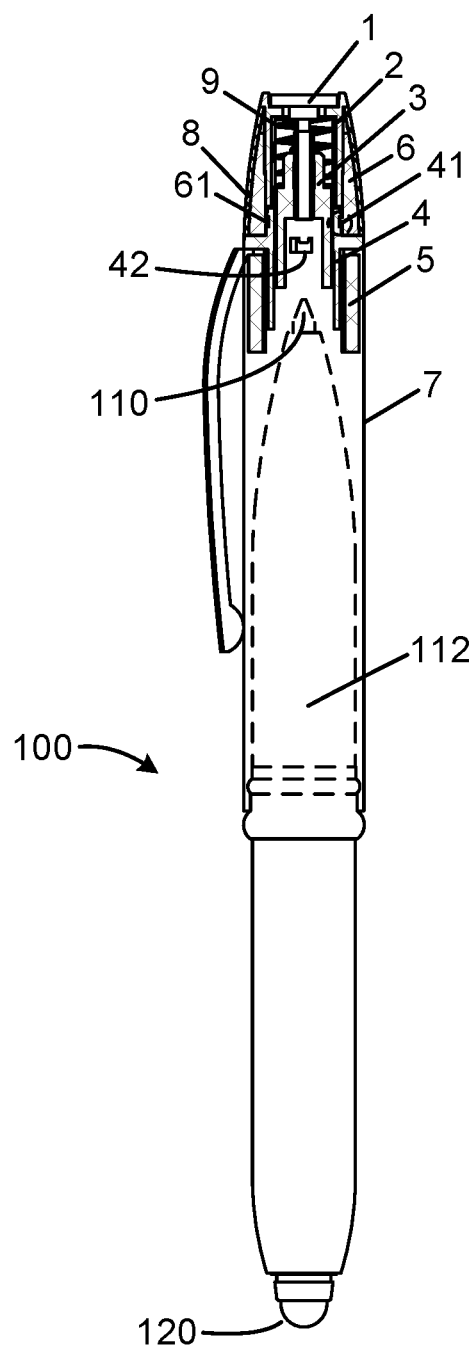
FIG. 2 is a partial section view of the embodiment of the invention, showing the touch tool in a retracted position.

As shown in FIGS. 1 and 2, an exemplary embodiment of a writing instrument touch mechanism includes a touch tool 1, an upper ring 2, a rotating wheel 3, a lower ring 4, a rotating sleeve liner 6 and a rotating sleeve 8. The touch mechanism is assembled to a pen holder 7, which in an exemplary embodiment may serve as a cap-like structure for a pen instrument 100. In an exemplary embodiment, the instrument 100 may include a writing tip 110 at one end of barrel 112. The tip 110 may be a ball point, a pencil, a marker tip or other type of writing implement. In this embodiment, the instrument 100 includes a tool such as a light source 120 mounted to the barrel at the end opposite the writing tip. In other embodiments, the writing tip, the light source, or both, may be omitted from the tool 100.

The touch tool 1 in this exemplary embodiment is a disc type touch tool, and includes a stylus disc 11 and a straight bar 12 connected with the center of the disc 11. The disc 11 may be a plastic material. The straight bar 12 may include a flexible portion of a plastic material.

The upper ring 2 is a hollow cylinder structure, wherein its upper part forms a step 21 in which the cylinder can accommodate the disc 11 of the touch tool 1 in a retracted position (FIG. 2). The upper ring 2 may be fabricated of ABS or other suitable material. The upper ring 2 with step 21 is supported on a rotating sleeve liner 6, and symmetrical vertical guide grooves 22 are arranged in the lower cylindrical inner chamber of the upper ring.

Figure 3:
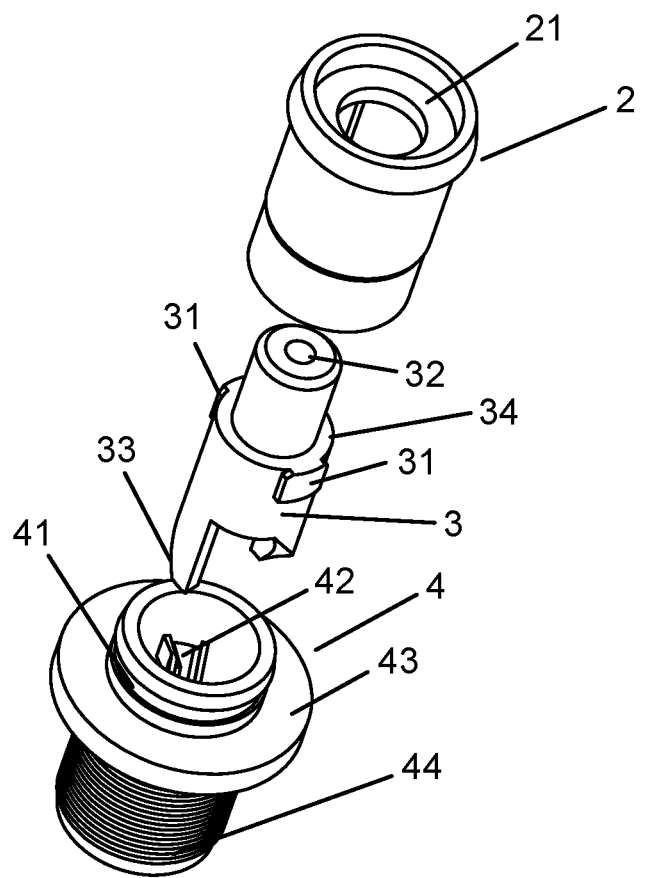
FIG. 3 shows the relationship among the upper ring, the rotating wheel and the lower ring of the embodiment of the invention.

A rotating wheel 3 (FIG. 3) has an upper part, provided with a cylindrical hole 32 for accommodating the straight bar 12 of the touch tool 1. The rotating wheel has an upper outer ring portion provided with guiding elements 31 matched with the guide grooves 22 of the upper ring 2, and the lower part is provided with an inclined surface portion 33 corresponding to a deck structure 42 of the lower ring 4.

The upper outer part of the lower ring 4 is provided with an annular spacing groove 41. The inner chamber of the lower ring 4 is provided with a deck structure 42 corresponding to the incline surface portion 33. The middle outer part of lower ring 4 is provided with a support ring or flange 43 which can be supported on the pen holder liner, and the lower outer part of the lower ring 4 is provided with threads 44.

The lower part of the rotating sleeve liner 6 is provided with a projection 61 corresponding to the annual spacing groove 41, and the projection 61 is spaced within the annular spacing groove 41.

The rotating sleeve 8 is arranged between the outer step 21 of the upper ring 2 and support ring 43 of the lower ring 4, and forms a tightening sleeve sheathed outside the rotating sleeve liner 6.

Threads corresponding to the threads 44 of the lower ring are arranged inside the pen holder liner 5, and the lower ring 4 is connected with the pen holder liner 5 through the threads. The outer part of the pen holder liner 5 is fixed to the inner chamber of the pen holder 7.

The straight bar 12 of the touch tool 1 is connected with the cylindrical hole 32 of the rotating wheel 3 via threads, so that straight bar 12 can be readily assembled and disassembled.

The connection relationship between the upper ring 2, the rotating wheel 3 and the lower ring 4 is shown in FIGS. 1 and 2, i.e. the upper ring 2 is sheathed outside the rotating wheel 3, the guiding element 31 of the rotating wheel 3 is inserted into the guide groove 22 of the upper ring 2, and the lower part of the rotating wheel 3 is inserted into the lower ring 4.

A spring 9 (FIG. 2) is also arranged between the inner surface of the step 21 of the upper ring 2 and the step 34 (FIG. 3) of the rotating wheel 3. The rotating wheel 3 is reset by the restoring force of the spring 9, so that the touch tool 1 is retracted into the step 21 of the upper ring, as shown in FIG. 1.

Figure 4:
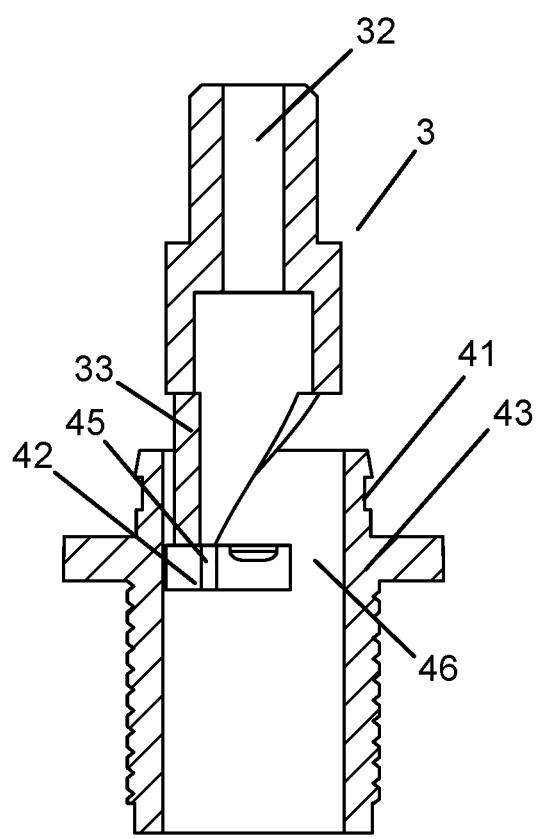
FIG. 4 shows the relationship between the rotating wheel and the lower ring of the embodiment of the invention.

After the touch tool 1, the upper ring 2, the spring 9, the rotating wheel 4, the rotating sleeve liner 6 and the rotating sleeve 8 are installed, the rotation of the rotating sleeve 8 relative to the pen body 7 can drive the rotating sleeve liner 6 and the rotating wheel 3 to rotate relative to body 7. The rotating sleeve 8 and the rotating sleeve liner 6 are spaced by the annular spacing groove 41 of the lower ring 4 so that they cannot move up and down relative to the lower ring 4, as shown in FIG. 1. When the incline surface 33 of the rotating wheel 3 butts against the deck 42 of the lower ring 4, the rotating wheel 3 is spaced or constrained by its guiding element 31, so that it cannot rotate and only can rise along the guide groove 22 of the upper ring 2; thereby, the touch tool 1 fixed to the rotating wheel 2 stretches or extends out of the upper ring 2, and when it reaches the highest point of the disc 11, the head of the surface 33 enters the groove 45 (formed in the lower ring 4) and is spaced as shown in FIG. 4, and the user can operate a touch sensitive surface of an intelligent device with the touch tool 1.

After use, the user rotates the rotating sleeve 8 to drive the rotating wheel 3 to rotate, the incline surface 33 of the rotating wheel 3 surmounts the deck 42 and enter the space 46 of the lower ring 4; the incline surface 33 falls into the space 46 by the restoring force of the spring 9, so that the entire rotating wheel is reset and the touch tool 1 is retracted into the step 21 of the upper ring.

Although the foregoing has been a description and illustration of specific embodiments of the invention, various modifications and changes thereto can be made by persons skilled in the art without departing from the scope and spirit of the invention.

What is claimed is:

1. A pen touch tool mechanism for extending and retracting a touch tool for operating a touch sensitive surface of an intelligent device, comprising:
   a touch tool, comprising a disc portion and a straight bar connected with a center region of the disc portion;
   a hollow cylindrical upper ring, wherein its upper part forms a step in which to accommodate the touch tool, and wherein the step is supported on a rotating sleeve liner, and a symmetrical vertical guide groove is arranged in a lower cylindrical inner chamber of the upper ring;
   a rotating wheel, wherein an upper part of the rotating wheel is provided with a cylindrical hole for accommodating the straight bar of the touch tool, the upper part is provided with a guiding element matched with the guide groove, and a lower part of the rotating wheel is provided with an incline surface corresponding to a deck of a lower ring;
   the lower ring, wherein an upper outer part of the lower ring is provided with an annular spacing groove, and an inner chamber of the lower ring is provided with a deck corresponding to the incline surface, and a middle outer part of the lower ring is provided with a support ring;
   a rotating sleeve assembly, arranged between the outer step of the upper ring and the support ring of the lower ring and sheathed outside the upper ring, a lower part of the rotating sleeve assembly is provided with a projection corresponding to the annular spacing groove, and the projection is spaced within the annular spacing groove of the lower ring;
   a pen holder, wherein the support ring of the lower ring is fixed inside the pen holder;
   wherein when the rotating sleeve assembly is rotated with respect to the pen holder, it drives the rotating wheel to rotate, the incline surface on the lower part of the rotating wheel touches the deck of the lower ring and butts against the deck, and the rotating wheel rises along with its rotation, so the touch tool disc portion fixed to the rotating wheel rises and extends out of the upper ring; during further rotation, the incline surface surmounts the deck and enters a space within the lower ring and the rotating wheel is reset under the restoring force of a spring, so that the touch tool disc portion is retracted into the step of the upper ring.

2. The touch tool mechanism of claim 1, wherein:
   the rotating sleeve assembly comprises a rotating sleeve and a rotating sleeve liner, wherein the rotating sleeve is sheathed outside the rotating sleeve liner, the rotating sleeve liner is sheathed outside the upper ring, its lower part is provided with a projection corresponding to the annular spacing ring, and the projection is spaced within the annual spacing ring of the lower ring.

3. The touch tool mechanism of claim 1, wherein:
   the touch tool is a disc type touch tool, of which an operation or writing is carried out with the disc portion on an intelligent device.

4. The touch tool mechanism of claim 1, further comprising:

a pen holder liner arranged and fixed to the inner chamber of the pen sheath, and the lower part of the lower ring is fixed to the pen holder liner.

5. The touch tool mechanism of claim 1, further comprising:

the threads formed on the lower part of the lower ring and configured to connect with the pen sheath liner.

6. A touch tool mechanism for extending and retracting a touch tool for operating a touch sensitive surface of an intelligent device, comprising:

a touch tool, comprising a stylus portion and an elongated bar connected with the stylus portion;

a hollow cylindrical upper ring structure, having an upper part forming a step in which to accommodate the touch tool, and wherein the upper ring structure is positioned in a rotating sleeve liner, and a vertical guide groove is arranged in a lower cylindrical inner chamber of the upper ring structure;

a rotating wheel structure, wherein an upper part of the rotating wheel is provided with a hole for accommodating the elongated bar, the upper part provided with a guiding element matched with the guide groove, and a lower part of the rotating wheel structure is provided with an incline surface corresponding to a deck structure of a lower ring structure;

the lower ring structure defining an inner chamber provided with the deck structure, and a middle outer part of the lower ring structure is provided with a support flange;

a rotating sleeve assembly, arranged between the step of the upper ring structure and the support flange and forming a sheath outside the upper ring structure;

a pen holder, wherein a portion of the lower ring structure is fixed inside the pen holder;

wherein when the rotating sleeve assembly is rotated with respect to the pen holder, it drives the rotating wheel structure to rotate, the incline surface touches the deck structure and butts against the deck structure, and the rotating wheel structure rises along with its rotation relative to the pen holder, so the touch tool stylus portion fixed to the rotating wheel rises and extends out of the upper ring structure, and during further rotation, the incline surface surmounts the deck structure and enters a space within the lower ring structure and the rotating wheel structure is reset under the restoring force of a spring, so that the touch tool stylus portion is retracted into the step.

7. The mechanism of claim 6, wherein:

the lower ring structure has an upper outer part provided with an annular spacing groove, and a lower part of the rotating sleeve assembly is provided with a projection corresponding to the annular spacing groove, and the projection is spaced within the annular spacing groove of the lower ring structure.

8. The mechanism of claim 6, wherein the spring is arranged between an inner surface of the step of the upper ring structure and a step of the rotating wheel structure.

9. The mechanism of claim 6, wherein:

the rotating sleeve assembly comprises a rotating sleeve and a rotating sleeve liner, wherein the rotating sleeve is sheathed outside the rotating sleeve liner, the rotating sleeve liner is sheathed outside the upper ring structure, and a lower part of the rotating sleeve liner is provided with a projection corresponding to an annular groove of the lower ring structure, and the projection is position within the annular groove of the lower ring structure.

10. The mechanism of claim 6, wherein:

the stylus portion is a disc type of the touch tool, of which an operation or writing is carried out with a disc portion on an intelligent device.

11. The mechanism of claim 6, further comprising:

a pen holder liner arranged and fixed to an inner chamber of the pen holder, and a lower part of the lower ring is fixed to the pen holder liner.

12. The mechanism of claim 6, further comprising:

threads formed on the lower part of the lower ring and configured to connect with the pen holder liner.

* * * * *